United States Patent [19]

Rodgers, Jr.

[11] Patent Number: 4,625,831

[45] Date of Patent: Dec. 2, 1986

[54] DEER STAND

[76] Inventor: Harvey B. Rodgers, Jr., 511 Catalpa, Clarksdale, Miss. 36614

[21] Appl. No.: 827,382

[22] Filed: Feb. 7, 1986

[51] Int. Cl.⁴ .............................................. A01M 31/02
[52] U.S. Cl. .................................... 182/116; 182/127; 182/164; 182/187
[58] Field of Search ............... 182/187, 188, 116, 115, 182/127, 163, 164

[56] References Cited

U.S. PATENT DOCUMENTS

| | | | |
|---|---|---|---|
| 1,960,588 | 5/1934 | Jorgensen | 182/127 |
| 2,035,537 | 3/1936 | Cowan | 182/116 |
| 3,282,375 | 11/1966 | Ray | 182/16 |
| 3,336,999 | 8/1967 | McSwain | 182/20 |
| 3,703,939 | 11/1972 | Maxwell | 182/116 |
| 4,022,292 | 5/1977 | Van Gompel | 182/187 |
| 4,061,202 | 12/1977 | Campbell | 182/187 |
| 4,134,474 | 1/1979 | Stavenau | 182/187 |
| 4,408,680 | 10/1983 | Ross | 182/187 |
| 4,457,391 | 7/1984 | Marques | 182/164 |
| 4,537,283 | 8/1985 | Humes | 182/127 |
| 4,552,247 | 11/1985 | Purdy | 182/187 |
| 4,579,198 | 4/1986 | Lee | 182/187 |

*Primary Examiner*—Reinaldo P. Machado
*Attorney, Agent, or Firm*—Walker & McKenzie

[57] ABSTRACT

A hunting stand pivotally mounted on the rack of an all-terrain vehicle. The stand comprises a pair of mounting brackets, a three-sectional ladder having pivot pins and locking pins for allowing the ladder to be positioned between an extended and a collapsed position; a platform having a V-shaped rear edge for resting against a tree trunk, a front edge for pivotal attachment to the top of the ladder, a pair of straight parallel sides, a top and a bottom; and a support for supporting the platform in an extended position for allowing a hunter to stand or sit on the top thereon.

7 Claims, 8 Drawing Figures

DEER STAND

BACKGROUND OF THE INVENTION

1. Field of the Invention:

The present invention relates, in general, to a collapsible hunting stand, mounted on an ATV.

2. Description of the Prior Art:

Heretofore, various patents have issued for portable stands. The following U.S. patents disclose hunting stands or ladder-like means used to place a person above the ground. See, for example, Ray, U.S. Pat. No. 3,282,375; McSwain, U.S. Pat. No. 3,336,999; Ross, U.S. Pat. No. 4,408,680; Jorgensen, U.S. Pat. No. 1,960,588; and Cowan et al, U.S. Pat. No. 2,035,537. None of the above patents disclose or suggest the present invention.

SUMMARY OF THE INVENTION

The present invention is directed toward providing an improved hunting stand. The concept of the present invention is to provide a collapsible hunting stand in combination with an all-terrain vehicle or the like.

The stand of the present invention comprises, in general, a pair of mounting brackets; first, second and third sections each having a pair of parallel spaced-apart side members and each having upper and lower ends; pivot means for pivotally mounting the lower end of the first section to the mounting brackets, the upper end of the first section to the lower end of the second section, the upper end of the second section to the lower end of the third section and the upper end of the third section to a platform; the platform having a rear edge for receiving a tree trunk, a front edge, a pair of opposed sides, a top and a bottom; a plurality of locking pins for locking the first, second and third sections in an extended position; and a pair of elongated support means having one end pivotally attached to each of the upper side members of the third section with the other end attached to each side of the platform by the locking pins to supportingly lock the platform in the extended position.

One of the objects of the present invention is to provide a stand that is portable and is attachable to any rack of an all-terrain vehicle.

Another object is to provide a stand that is easy to extend or collapse.

A further object is to provide a compact stand that folds into the rack of an all-terrain vehicle.

DESCRIPTION OF THE PREFERRED EMBODIMENT

The hunting stand 11 of the present invention is for use in combination with an all-terrain vehicle 13, or the like, commonly referred to as a three-wheeler, a four-wheeler or an ATV by those who are skilled in the art. The ATV 13 comes factory equipped with a tubular rack 15 bolted on behind the seat 17 thereof.

Figure 1:
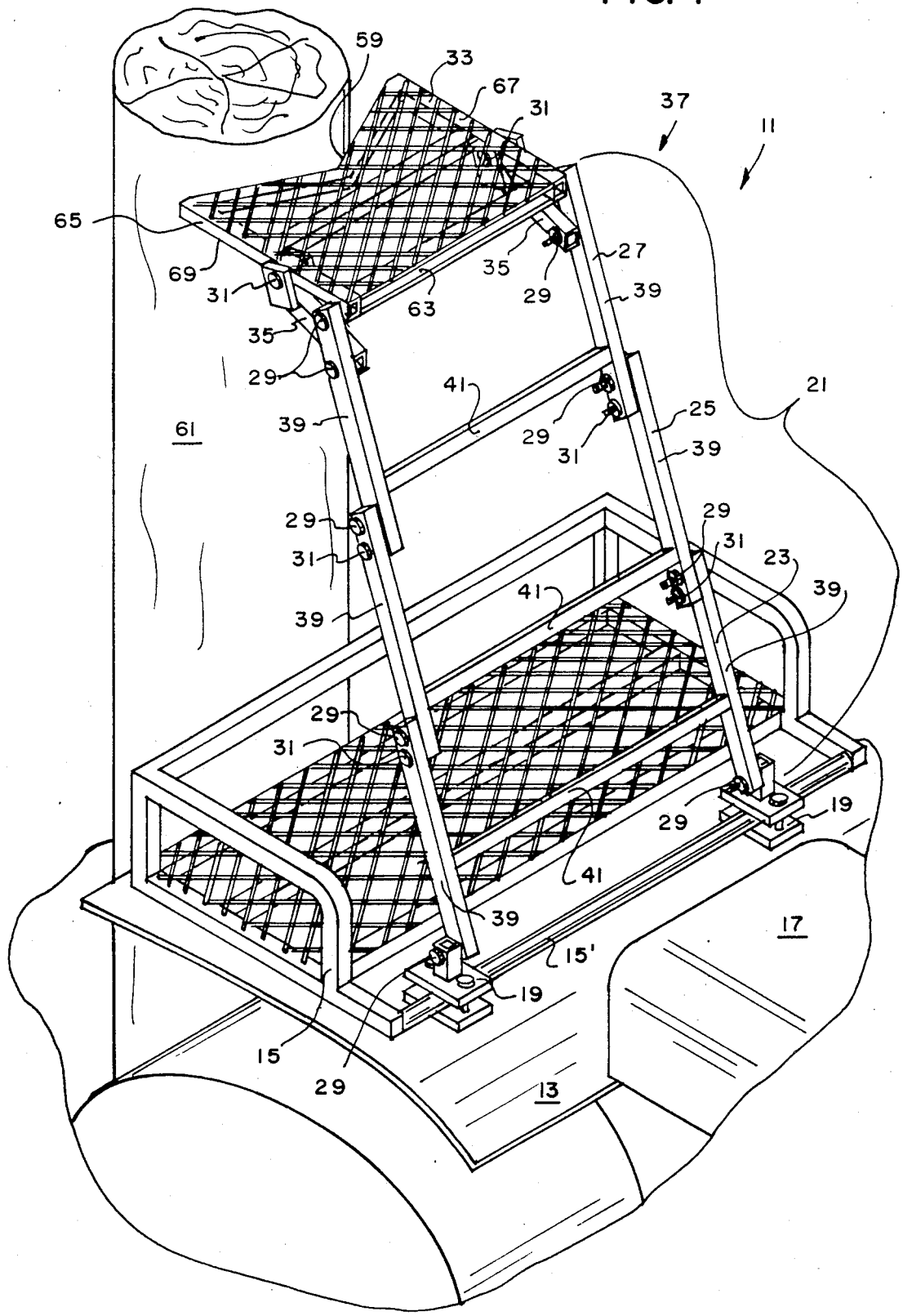
FIG. 1 is a perspective view of the hunting stand of the present invention with the stand in the extended position.

Looking at FIG. 1 of the drawings, the hunting stand 11 includes a pair of mounting brackets 19 for attachment of stand 11 to rack 15, a ladder means 21 having a first section 23 which is the lower section, a second section 25 which is the middle section and a third section 27 which is the upper section thereof, a pivot means 29, locking pins 31, a platform 33, and a pair of support means 35 for supporting platform 33 in an extended position 37.

The first section 23, second section 25, and third section 27 are each constructed out of a pair of elongated tubular steel side walls 39 of the type well known to those skilled in the art. The side walls 39 are in parallel spaced relationship and have an elongated steel tubular rod member 41 laterally disposed between the parallel side walls 39 and integrally attached thereto. The length of the rod member 41 of the first section 23 is substantially longer in relationship to the length of the rod member 41 in the second section 25 and the length of the rod member 41 in the third section 27 is substantially shorter in relationship to the length of the rod member 41 of the second section 25.

Figure 2:
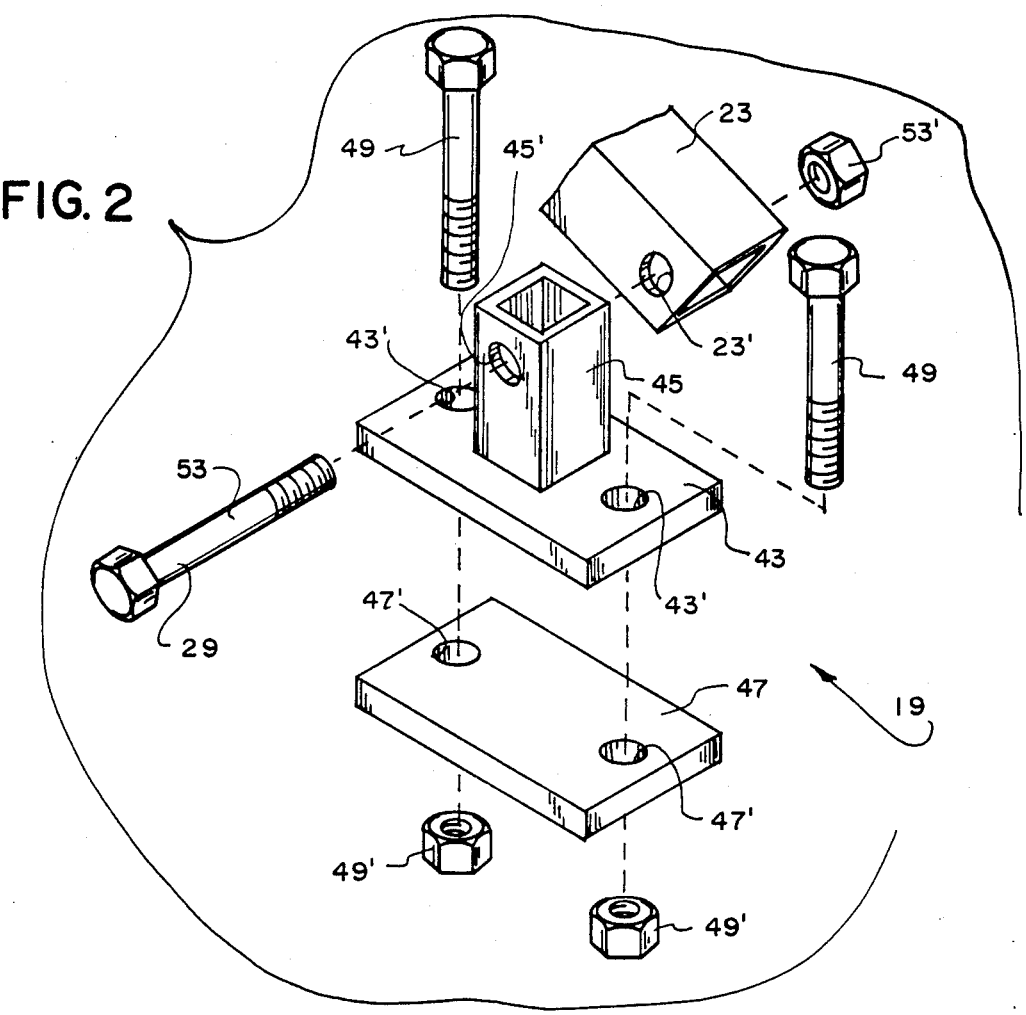
FIG. 2 is an exploded view of the mounting bracket of the present invention.
Figure 7:
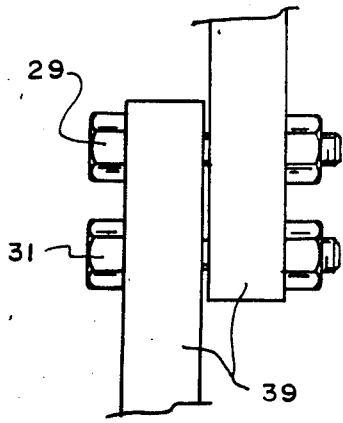
FIG. 7 is an enlarged front elevational view of a portion of the ladder means thereof showing the pivot means and locking pin.
Figure 8:
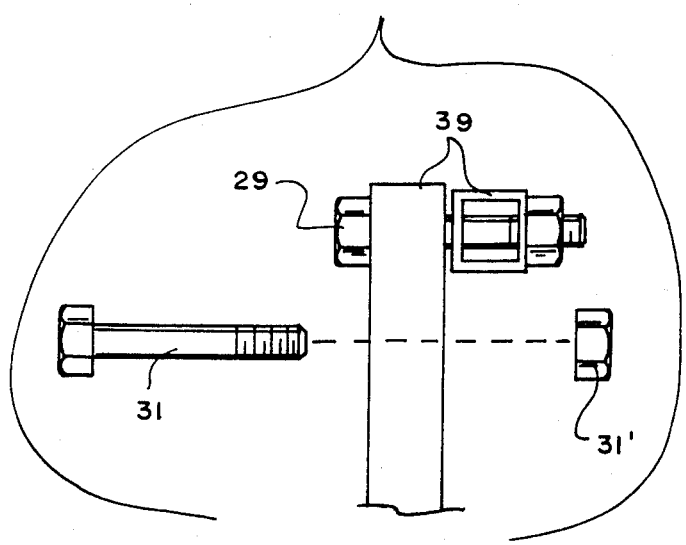
FIG. 8 is an enlarged front elevational view of a portion of the side member and pivot means showing the locking means in an unlocked position.
Figure 3:
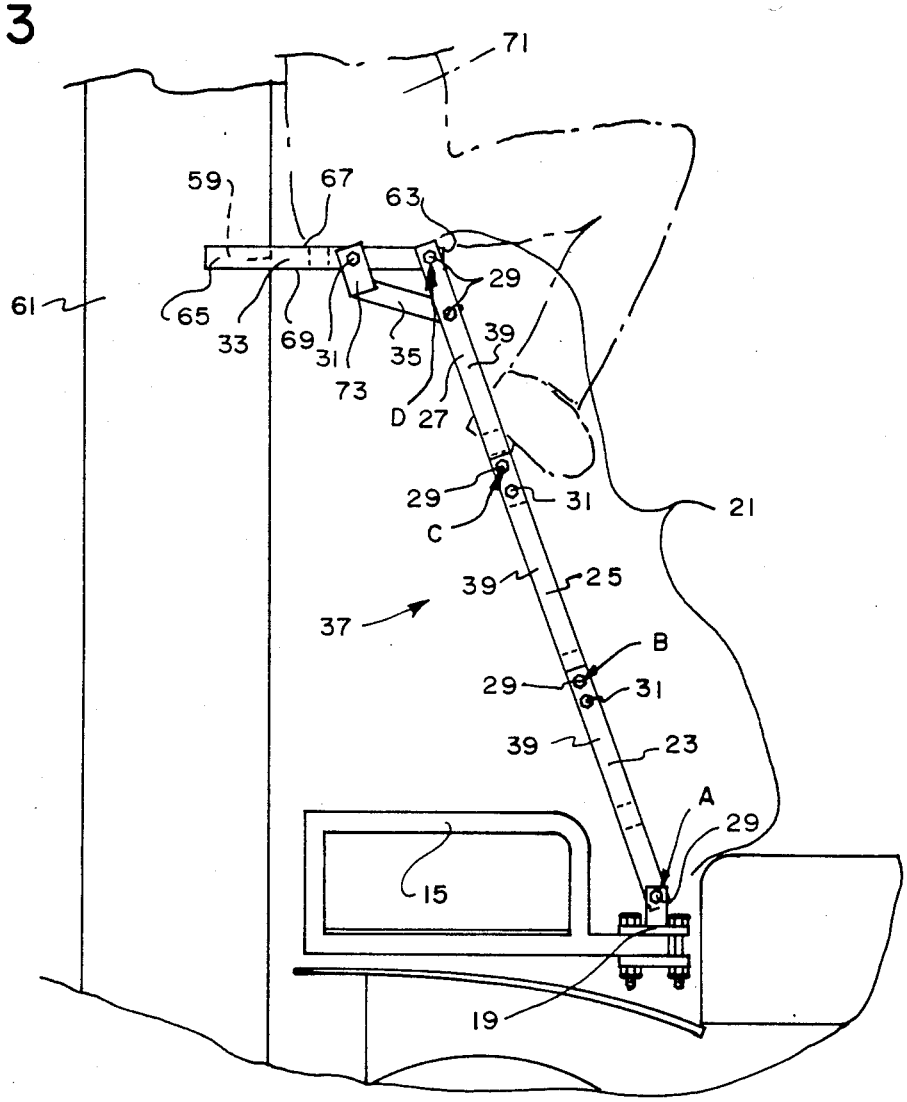
FIG. 3 is a left side elevational view of the stand thereof, with the stand in an extended position.
Figure 6:
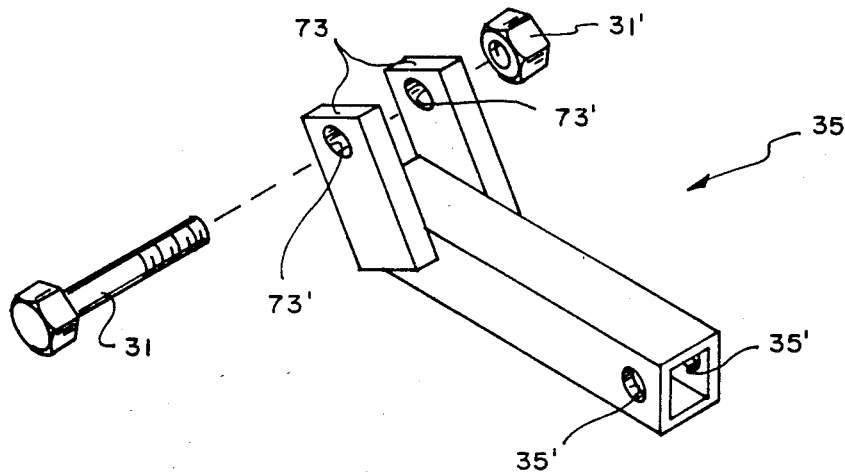
FIG. 6 is a perspective view of the support means thereof.

Mounting brackets 19 are fixedly mounted to the tubing 15' of rack 15 for attachment of the stand 11 thereon. Each mounting bracket 19(see FIG. 2) includes an upper rectangular plate 43 preferably of metal having apertures 43' vertically disposed in each end thereof, includes a leg 45 which is a short length of elongated tubing integrally attached to the center of plate 43 and extending upwardly therefrom, and includes a lower rectangular plate 47 preferably of metal having apertures 47' vertically through each end thereof. Each mounting bracket 19 is mounted to tubing 15' of rack 15 with the upper plate 43 positioned on top of tubing 15' and with lower plate 47 disposed underneath the upper plate 43 with the tubing 15' of the rack 15 sandwiched therebetween. Bolts 49 are received through the apertures 43', 47' and secured at the other ends by nuts 49' (see FIGS. 3, 4, and 5). If desired, the upper end of bolts 49 may be attached to the bottom of the upper plate 43 by welding, or the like, thereby eliminating the apertures 43' in the upper plate 43. Leg 45 has an aperture 45' through the upper end thereof which runs horizontally from side to side for receiving a pin member 53 of the pivot means 29. The mounting brackets 19 may be mounted on either the inside or the outside of the side walls 39 of the first section 23 of the ladder means 21.

Each of the pivot means 29 may be of any construction well known to those skilled in the art, but each preferably includes a pin member 53 which is threaded and has a nut 53' to hold the pin member in place. Each of the pivot means 29 extend through suitable aligned apertures 23' (one shown, FIG. 2), 45' to pivotally mount the lower end of the first section 23 to the upwardly extending legs 45 of mounting brackets 19, the upper end of first section 23 to the lower end of the second section 25, the upper end of the second section 25 to the lower end of the third section 27, and the upper end of the third section 27 to the platform 33.

Figure 4:
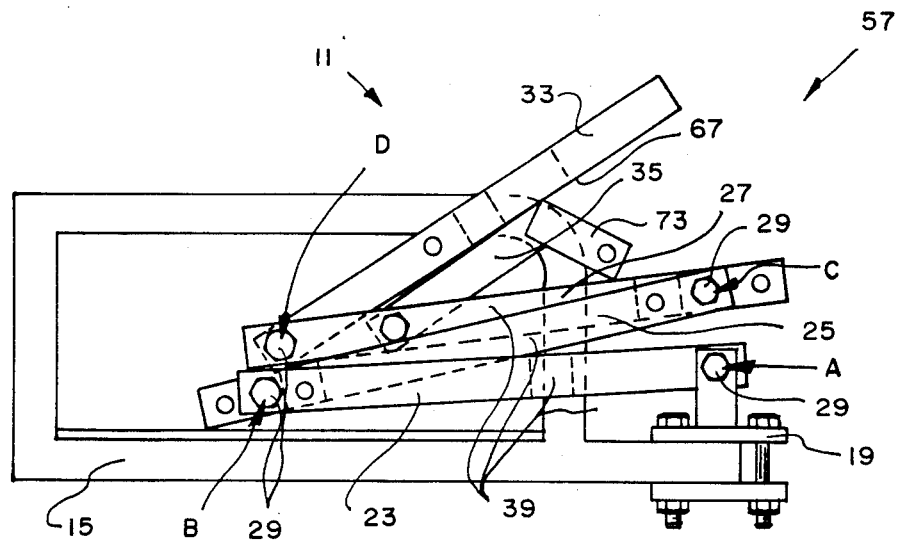
FIG. 4 is a left side elevational view of the stand in the collapsed position, the right side is substantially similar thereto.
Figure 5:
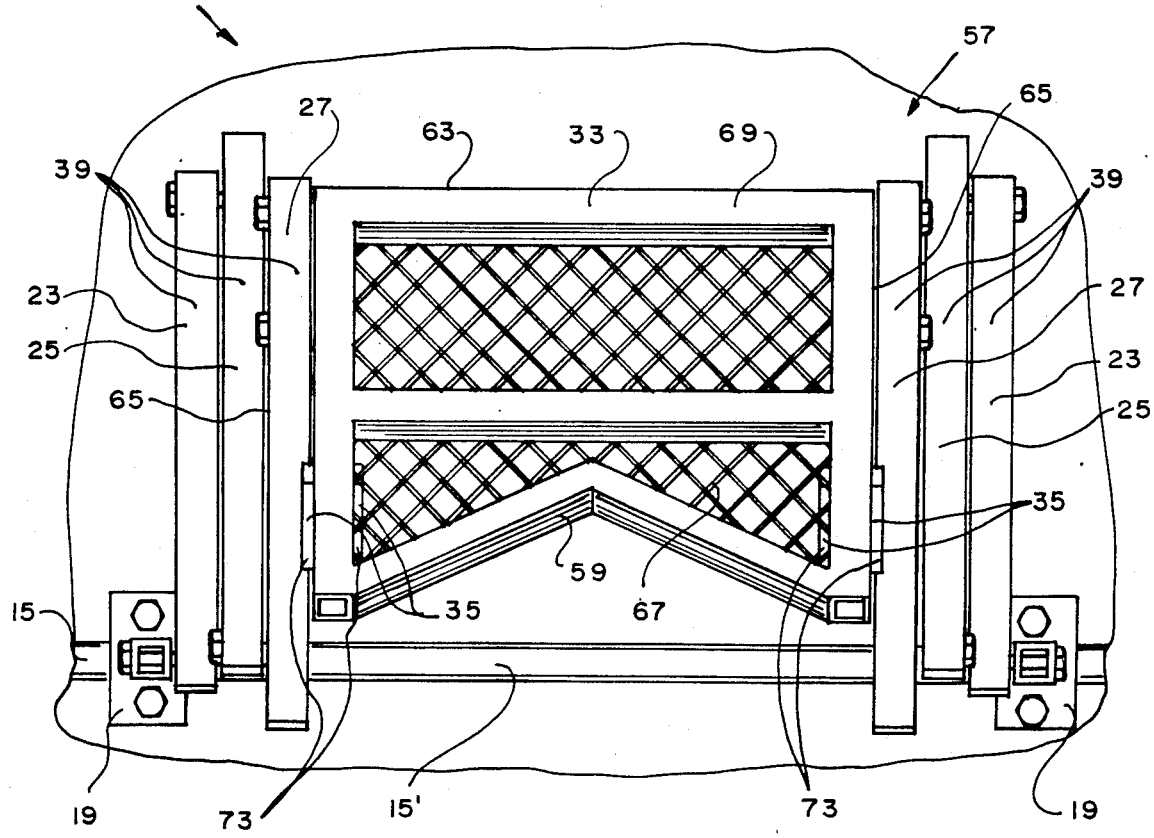
FIG. 5 is a top plan view of the stand thereof in the collapsed position.

Each of the locking pins 31 may be of any construction well known to those skilled in the art, but are preferably threaded and include a nut 31' to hold the pin in place. The locking pins 31 extend through suitable aligned apertures, not shown, in overlapping portions of the side walls 39 of sections 23, 25 and 27 to lock the first section 23, second section 25, and third section 27 in an extended position 37 (see FIGS. 1 and 3). Removal of the locking pins 31 allows the first, second and third sections 23, 25 and 27 to fold into a collapsed position 57, as shown in FIGS. 4 and 5.

Platform 33 is constructed out of elongated metal tubing in a manner well known to those skilled in the art. Platform 33 (see FIGS. 1 and 5) includes a V-shaped rear edge 59 for receiving a trunk of a tree 61, a front edge 63, two straight sides 65 that are in spaced parallel relationship, a top 67 that has an expanded metal grating welded thereon to allow a hunter 71 to stand or sit thereon. The sides 65 have apertures, not shown, therethrough adjacent the front edge 63 thereof to provide means for the attachment to the upper end of the third section 27 of the ladder means 21. Other apertures, not shown, are disposed in the sides 65 adjacent the front edge 63 and are positioned substantially back a short distance from the front edge 63 of the platform 33, the use of which will hereinafter become apparent.

Each of support means 35 is constructed out of elongated metal tubing having apertures 35' through one end thereof. The support means 35 are attached by pin members 53 to the inside upper end of the third section 27 of the ladder means 21. The other end of each of support means 35 has two protruding metal lugs 73 integrally attached to the opposed sides thereof and extending outwardly at an angle so as to allow a portion of a side 65 of the platform 33 to slide therebetween. Each of the lugs 73 has an aperture 73' through the outwardly extending ends so as to receive a locking pin 31 that will freely pass through the apertures 73' in the lugs and through the aperture, not shown, in a side 65 of the platform 33 to support the platform 33 in an extended position 37.

A hunter 71 drives the ATV to the desired hunting spot and backs the ATV up a short distance away from a trunk of a tree 61. The stand 11, which is normally in the collapsed position 57 (see FIGS. 4 and 5), is conveniently stored within the rack 15 of the ATV 13. The hunter then manually lifts platform 33 and third section 27 and rotates the support means 35 into position and locks same by inserting locking pins 31 through the apertures 73' in lugs 73 and sides 65 of platform 33. The hunter continues to lift the third section 27 and platform 33 and when the third section 27 and second section 25 are in alignment, he inserts a locking pin 31 through the apertures, not shown, in each side of the lower end of the third section 27 and upper end of the second section 25. Then, the hunter continues to lift and when the second section 25 and the first section 23 are in alignment, he inserts a locking pin 31 through the apertures, not shown, in each side of the lower end of the second section 25 and through the upper end of the first section 23. After the locking pins 31 are secured (see FIG. 5), the stand 11 is simply pivoted at point A and is leaned against the trunk of the tree 61 into a "use" position. The hunter 71 can then climb up the stand 11 by using the rod members 41 as steps and he can either stand or sit on the top 67 thereof.

To place stand 11 in the collapsed position 57 the locking pins 31 are simply removed, therefore allowing the ladder means 21 to pivotally move at points A, B, C, and D. The first section 23 folds counterclockwise into rack 15, second section 25 folds clockwise and rests on top of first section 23, third section 27 folds counterclockwise resting on top of second section 25, support means 35 rotates counterclockwise on top of third section 27 and platform 33 folds clockwise with the top 67 resting on support means 35 (see FIGS. 4 and 5).

From the foregoing it will be understood that a hunting stand is provided that is transported on the rack of an ATV or the like. Such a stand is quickly and easily brought into place for use or made ready to transport to the next hunting site, thereby overcoming many of the disadvantages of previous hunting stands. It has been found that it only takes a hunter approximately one and one-half minutes to extend or collapse the stand of the present invention. In addition, the stand 11 can be leaned against any substantial size tree.

Although the present invention has been described and illustrated with respect to a preferred embodiment thereof and a preferred use therefore, it is not to be so limited since changes and modifications can be made therein which are within the full intended scoped of the invention.

I claim:

1. A hunting stand for use with an all-terrain vehicle, or the like, said stand comprising:
    (a) mounting bracket means for mounting said stand to the rack of an all-terrain vehicle;
    (b) a plurality of sections;
    (c) pivot means attached to said sections for pivotally coupling said sections together in end-to-end relationship to establish ladder means movable into a collapsed overlapping position in said rack and an extended position out of said rack;
    (d) a platform having a rear edge for engaging a tree trunk;
    (e) means secured to said platform and said ladder means adjacent the upper end thereof for securing said platform to said ladder means;
    (f) means for securing said ladder means in an extended position;
    (g) means secured to said mounting bracket means and said ladder means adjacent the lower end thereof for pivotally coupling said ladder means to said mounting means to permit said ladder means to move into said collapsed overlapping position in said rack and to move into a use position against a tree when said ladder means is secured in said extended position.

2. The stand of claim 1 in which said means secured to said platform and said ladder means includes means for selectively fixedly securing said platform relative to said ladder means and for allowing pivot of said platform relative to said ladder means.

3. The stand of claim 1 in which said mounting bracket means includes a pair of mounting brackets and in which each of said brackets includes an upper plate, a lower plate and means for securing said upper and lower plates in clamping relationship to said rack.

4. The stand of claim 3 in which said means for pivotally coupling said ladder means to said mounting bracket means includes pin members and in which each of said mounting brackets includes an upwardly extending leg centrally disposed on top of said upper plate, said leg having an aperture therethrough for receiving one of said pin members therethrough.

5. The stand of claim 1 in which said sections include a first section, a second section, and a third section, each first, second, and third section includes an elongated transversely extending rod member for use as a step when said stand is in said use position.

6. The stand of claim 5 in which each of said sections includes a pair of side walls in spaced parallel relationship and a said rod member fixedly attached at the opposite ends thereof to said side walls.

7. The stand of claim 6 in which said second section has a horizontal width substantially less than the horizontal width of said first section, and in which said width of said second section is substantially larger than the width of said third section.

* * * * *